United States Patent [19]

Ogasawara et al.

[11] Patent Number: 5,784,112
[45] Date of Patent: Jul. 21, 1998

[54] ENCODING APPARATUS

[75] Inventors: Yoshimi Ogasawara, Yokohama; Katsumi Karasawa, Kawasaki, both of Japan

[73] Assignee: Canon Kabushiki Kaisha, Tokyo, Japan

[21] Appl. No.: 826,879

[22] Filed: Apr. 7, 1997

Related U.S. Application Data

[63] Continuation of Ser. No. 264,347, Jun. 23, 1994, abandoned.

[30] Foreign Application Priority Data

Jul. 2, 1993 [JP] Japan .................................. 5-164666
Sep. 10, 1993 [JP] Japan .................................. 5-249787

[51] Int. Cl.$^6$ .......................... H04N 7/04; H04N 7/14
[52] U.S. Cl. ...................... 348/423; 348/484; 370/522
[58] Field of Search ........................ 348/423, 435, 348/434, 478, 385, 387, 463, 465, 425, 484; 310/522, 537; H04N 7/04, 7/14

[56] References Cited

U.S. PATENT DOCUMENTS

| | | | |
|---|---|---|---|
| 5,083,206 | 1/1992 | Knauer et al. ........................ | 348/423 |
| 5,231,384 | 7/1993 | Kuriacose ............................ | 348/388 |
| 5,231,492 | 7/1993 | Dangi et al. ........................ | 348/423 |
| 5,392,284 | 2/1995 | Sugiyama ........................... | 348/17 |

*Primary Examiner*—Glenton B. Burgess
*Attorney, Agent, or Firm*—Fitzpatrick, Cella Harper & Scinto

[57] ABSTRACT

An encoding apparatus includes an encoding unit for encoding input video data, a storage unit for storing the video data encoded by the encoding unit, a control unit for controlling the amount of video data which has a format including a vertical blanking interval output from the encoding unit in accordance with the amount of data stored in the storage unit, and a multiplexing unit for multiplexing additional data with the video data encoded by the encoding means during the vertical blanking period of the video data. Another encoding apparatus includes a first input unit for inputting first data, a second input unit for inputting second data, an encoding unit for encoding the first data input by the first input unit, a detection unit for detecting the amount of the second data input by the second input unit, a multiplexing unit for multiplexing the second data with the first data encoded by the encoding uit, and a control unit for controlling the multiplexing processing of the multiplexing unit in accordance with an output from the detection unit.

12 Claims, 5 Drawing Sheets

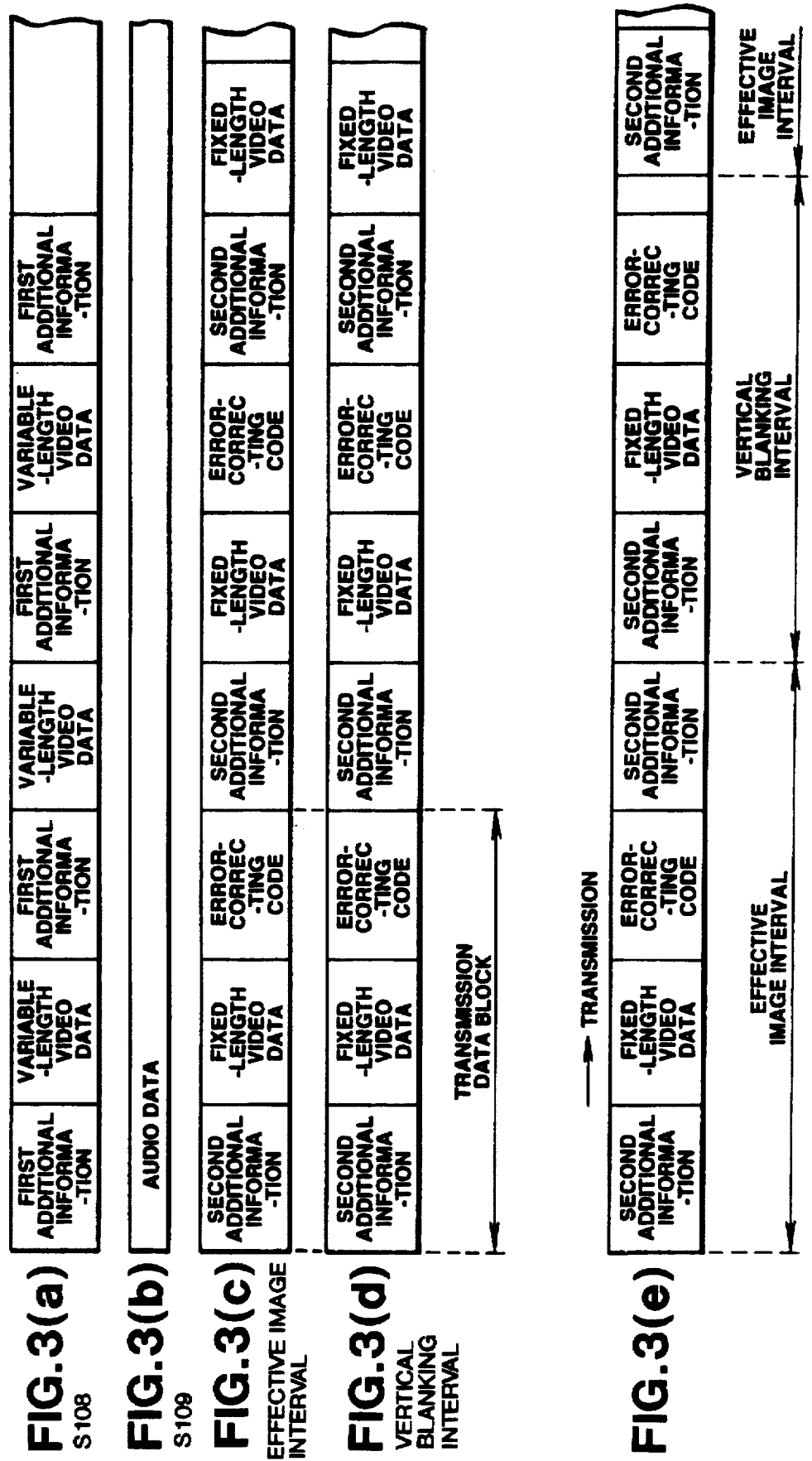

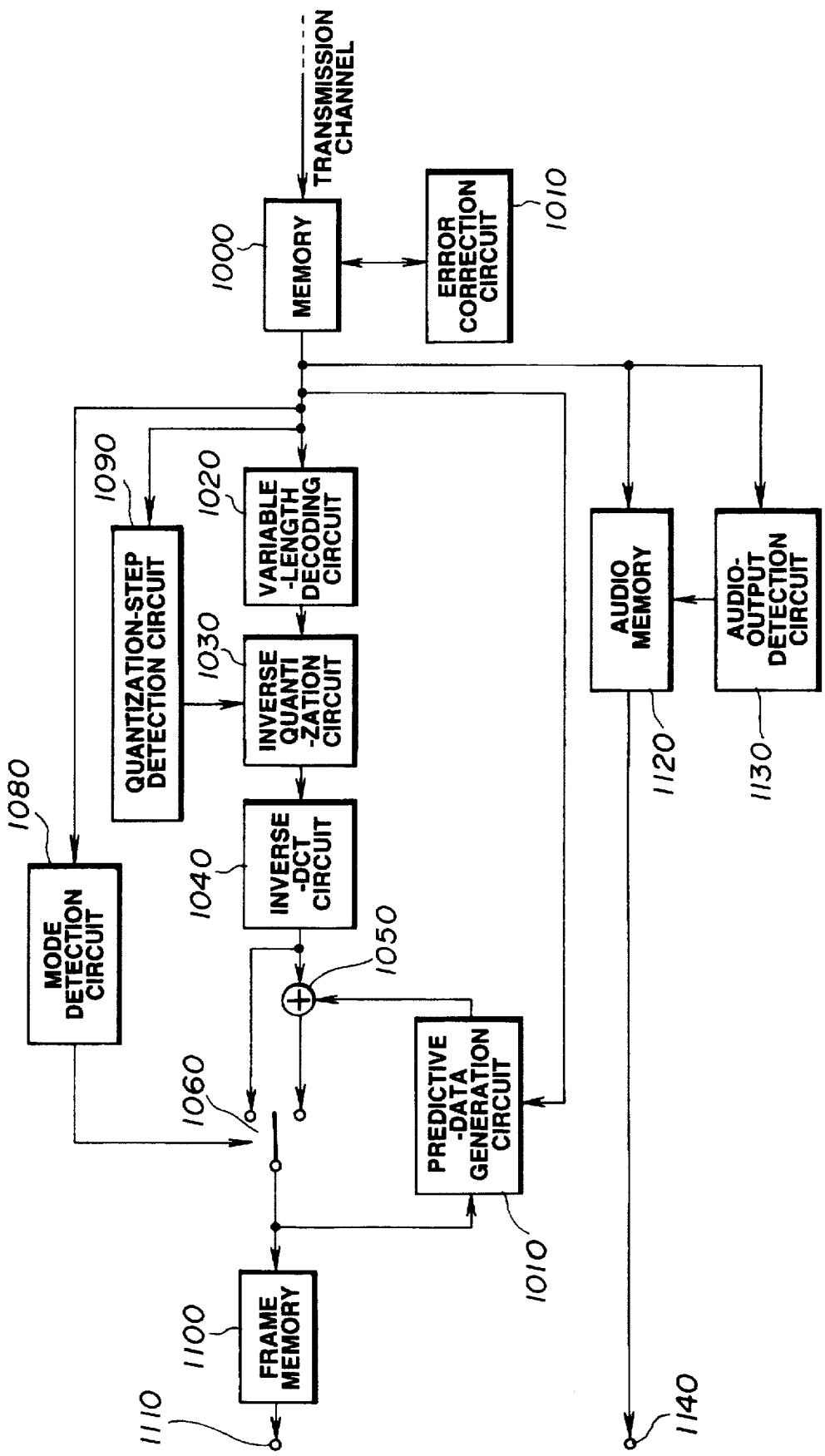

ENCODING APPARATUS

This application is a continuation of application Ser. No. 08/264,347 filed Jun. 23, 1994, now abandoned.

BACKGROUND OF THE INVENTION

1. Field of the Invention

This invention relates to an encoding apparatus. More specifically, the invention relates to the control of the amount of codes of encoded video data and multiplexing processing when the video data and other information are transmitted.

2. Description of the Related Art

In the field of digital transmission of video information, a technique of encoding the information with high efficiency has made progress. In this technique, a transmission system is used in which variable-length encoded data, obtained by encoding a video signal having a large amount of information with high efficiency, and audio data, are configured in a format having a predetermined fixed length. The resultant data is transmitted at a constant transmission rate, and the amount of the above-described variable-length encoded data which is generated is controlled to fall within a predetermined range.

In such a transmission system, the transmission side, which performs an encoding operation, quantizes video data provided, for example, in the form of blocks in units of 8×8 pixels (picture elements) after performing orthogonal transformation of the data. The quantized data is subjected to variable-length encoding, whereby the data is compressed. The compressed data is stored in a buffer memory.

A control signal is formed in accordance with the amount of data stored in the buffer memory, and controls the size of quantization steps of a quantization circuit for performing the above-described quantization, whereby the amount of data stored in the buffer memory is controlled to be within a predetermined range.

That is, when the amount of data stored in the buffer memory increases toward the permissible upper limit, coarse quantization is executed by increasing the size of quantization steps in response to the control signal, so as to reduce the amount of generation of data. On the other hand, when the amount of data stored in the buffer memory decreases toward the permissible lower limit, fine quantization is executed by reducing the size of quantization steps, so as to increase the amount of generation of data.

The above-described buffer control is generally performed for one horizontal line or a few horizontal lines of video data depending on the capacity of the buffer memory.

Digital audio data is stored in an audio memory, which performs interleaving processing in order to protect transmission errors.

Parities for error correction are added to the audio data stored in the audio memory and the video data stored in the buffer memory. The resultant audio data and video data are multiplexed in the form of a transmission format, having a predetermined fixed length as shown in FIG. 1, and the resultant data is transmitted to a transmission channel.

At the reception side, which performs a decoding operation, the data transmitted through the transmission channel is subjected to transmission-error correcting processing, and is separated into video data and audio data. By performing various kinds of processing, such as variable-length decoding, inverse quantization, inverse orthogonal transformation, and the like, video data divided into blocks is obtained.

The audio data is subjected to deinterleaving processing, and is output.

However, when audio data is multiplexed with video data, subjected to variable-length encoding by means of buffer control such that the amount of generation of the variable-length encoded data is within a predetermined range, in a transmission format having a predetermined fixed length as shown in FIG. 1, and the resultant data is transmitted, the following problems arise.

Consider, for example, the amount of generation of data per frame interval of video data. Since video data having a large amount of information is subjected to variable-length encoding, the amount of generated encoded data greatly changes depending on the contents of the video data, while the audio data has a constant amount of information. Hence, when data transmitted in a predetermined transmission format, as shown in FIG. 1, is decoded, the phase relationship between the video data for one frame and the audio data corresponding to the video data changes, as a result of which the audio data cannot be synchronized with the video data.

Furthermore, in transmission using a predetermined transmission format as shown in FIG. 1, when, for example, audio data is not transmitted, the area for audio data in the transmission format becomes vacant, thereby causing a waste of the capacity of the transmission channel.

In addition, when multiplexing video data and audio data having different amounts of generated information, a reading operation of video data from the buffer memory is interrupted during multiplex transmission of audio data. However, since video data is continuously written in the buffer memory, the amount of storage of video data in the buffer memory increases.

As described above, in such a case, the system is controlled so as to provide coarse quantization steps of the quantization circuit.

That is, the increase in the amount of storage of video data in the buffer memory is not caused by variable-length encoding, but is caused by interrupting the reading operation of video memory from the buffer memory. Accordingly, the picture quality of quantized video data is degraded by the above-described buffer control.

SUMMARY OF THE INVENTION

The present invention has been made in consideration of the above-described problems.

It is an object of the present invention to provide an encoding apparatus, in which information other than video data can be multiplexed with the video data without degrading the picture quality of the video data.

It is another object of the present invention to provide an encoding apparatus, in which, when second information data is multiplexed with encoded first information data and the resultant data is transmitted, the second information data can always be synchronized with the first information data irrespective of the amount of the first information data, and a transmission channel can be efficiently utilized.

According to one aspect, the present invention which achieves these objectives relates to an encoding apparatus comprising encoding means for encoding input video data, storage means for storing the video data encoded by the encoding means, control means for controlling the amount of video data output from the encoding means in accordance with the amount of data stored in the storage means, and multiplexing means for multiplexing information data with the video data encoded by the encoding means during a vertical blanking period of the video data.

According to another aspect, the present invention relates to an encoding apparatus comprising encoding means for encoding input first information data, storage means for storing the first information data encoded by the encoding means, detection means for detecting the amount of input second information data, and control means for controlling the amount of the first information data output from the encoding means in accordance with the amount of data stored in the storage means and an output from the detection means.

According to still another aspect, the present invention relates to an encoding apparatus comprising encoding means for performing variable-length encoding of first information data, multiplexing means for multiplexing second information data with first information data, encoded by the encoding means, so as to be configured in a format having a predetermined fixed length, detection means for detecting the amount of the second information data, and control means for controlling the amount of data while the first information data is encoded, in accordance with an output from the detection means.

According to yet another aspect, the present invention relates to an encoding apparatus comprising first input means for inputting first information data, second input means for inputting second information data, encoding means for encoding the first information data input by the first input means, detection means for detecting the amount of the second information data input by the second input means, multiplexing means for multiplexing the second information data with the first information data encoded by the encoding means, and control means for controlling the multiplexing processing of the multiplexing means in accordance with an output from the detection means.

The foregoing and other objects, advantanges and features of the present invention will become more apparent from the following detailed description of the preferred embodiments taken in conjuction with the accompanying drawings.

BRIEF DESCRIPTION OF THE DRAWINGS

FIG. 3 is a diagram illustrating the configuration of a fixed-length transmission format obtained by multiplexing audio data with video data in the first embodiment;

FIG. 5 is a block diagram of an encoding apparatus according to a second embodiment of the present invention.

DETAILED DESCRIPTION OF THE PREFERRED EMBODIMENTS

A description will now be provided, with reference to the drawings, of an encoding apparatus in which audio data is multiplexed with video data subjected to variable-length encoding by buffer control of the present invention, and the resultant data is transmitted at a predetermined transmission rate.

Figure 1:
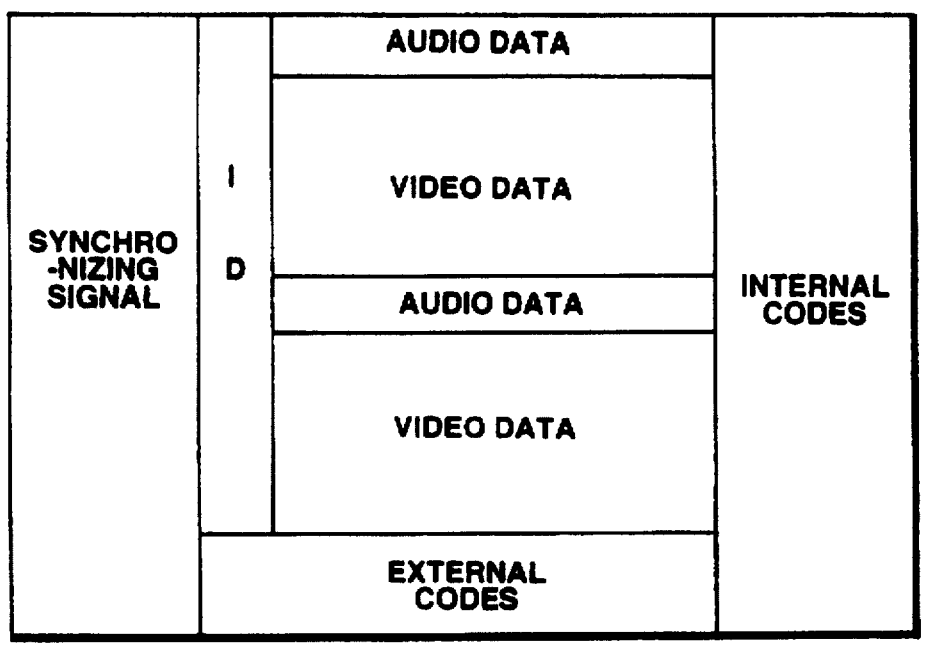
FIG. 1 is a diagram illustrating a conventional data transmission format.
Figure 2:
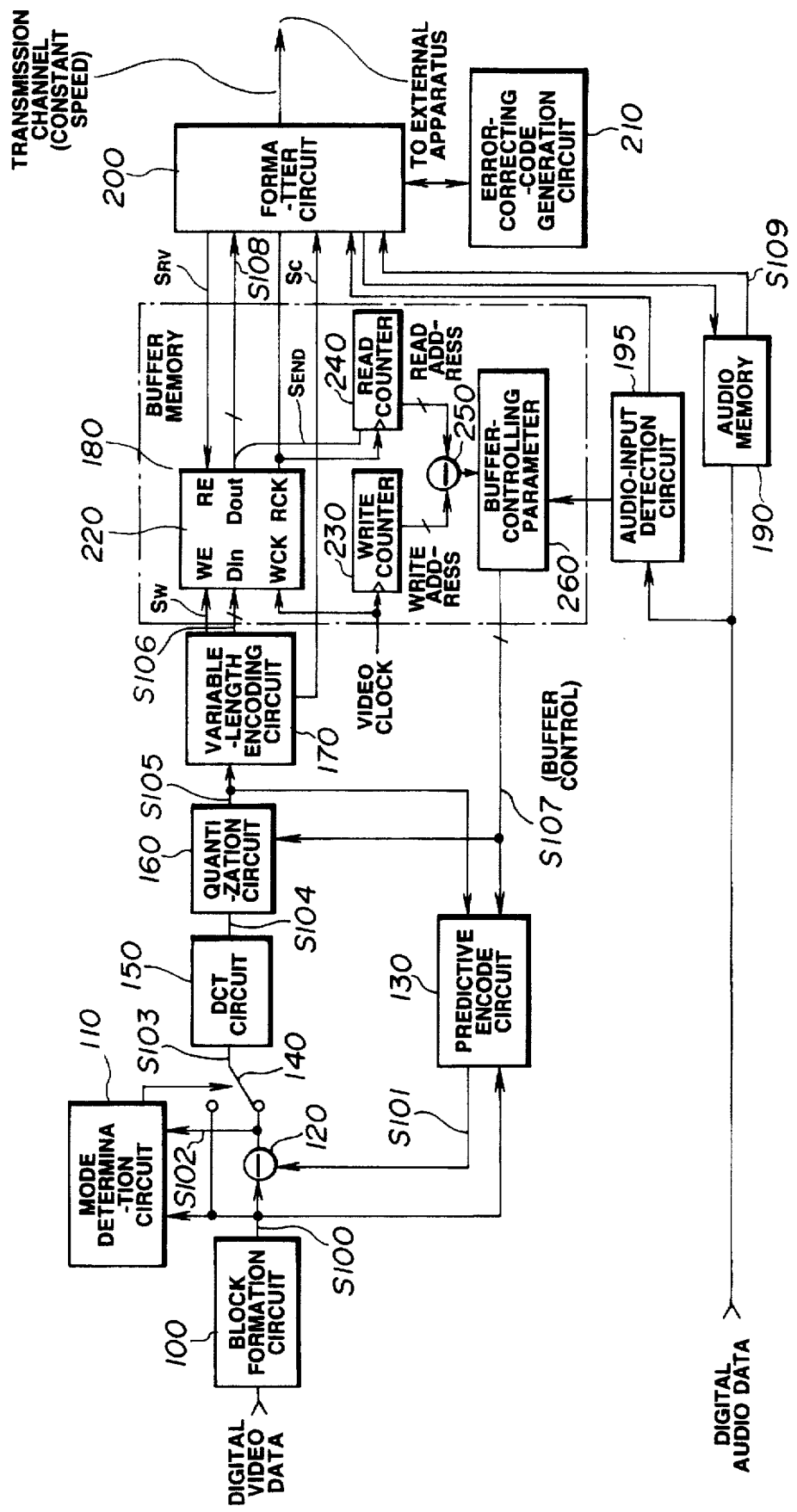
FIG. 2 is a block diagram of an encoding apparatus according to a first embodiment of the present invention.

FIG. 2 is a block diagram of an encoding apparatus according to the first embodiment of the present invention.

In FIG. 2, first, an input digital video signal is divided in blocks, for example, in units of (8×8) pixels by a block formation circuit 100.

The luminance signal and the chrominance signal of the video signal are further converted into block data S100 (hereinafter termed macroblock data), in units of encoding processing comprising data of (16×16) pixels, and the data is supplied to a mode determination circuit 110, a calculation circuit 120, and a predictive encoding circuit 130.

The mode determination circuit 110 calculates the electric power of difference-value data S102 obtained by subtracting predictive data S101, generated by the predictive encoding circuit 130, from the macroblock data S100, by the calculation circuit 120, and the electric power of the macroblock data S100. Macroblock data S103, having a smaller electric power (i.e., data having a smaller amount of generated information), is selected by a switch 140, and is supplied to a DCT (discrete cosine transform) circuit 150.

In this case, the following encoding operation using the macroblock data S100 corresponds to an in-frame encoding operation, and the following encoding operation using the difference-value data S102 corresponds to an interframe encoding operation.

The DCT circuit 150 performs DCT processing of the data S103 selected by the mode determination circuit 110.

Data S104 obtained by the DCT processing is supplied to a quantization circuit 160, which quantizes the supplied data and outputs quantized data S105.

The quantized data S105 is input to a variable-length encoding circuit 170, which performs variable-length encoding of the input data. Hence, the amount of generated data differs for each macroblock. Transmission data S106, in which a flag capable of identifying respective boundaries between generated data for adjacent macroblocks is provided, is supplied to a memory 220 within a buffer memory 180.

The write control for the memory 220 is performed by a write control signal Sw from the variable-length encoding circuit 170, and the read control for the memory 220 is performed by a video-data read control signal SRV from a formatter circuit 200.

A description will now be provided of the data transmission format of the present embodiment with reference to FIG. 3.

FIG. 3 is a diagram illustrating the data transmission format formed by the encoding apparatus shown in FIG. 2.

In FIG. 3, (a) illustrates video data input to the formatter circuit 200, (b) illustrates audio data input to the formatter circuit 200, (c) illustrates an example in which the data shown in (a) is formed in a fixed-length transmission format for an effective image interval conforming to the transmission-channel rate, (d) illustrates an example in which the data shown in (b) is formed in a fixed-length transmission format for a vertical blanking interval conforming to the transmission-channel rate, and (e) illustrates a fixed-length data string output from the formatter circuit 200.

First additional information shown in (a) indicates parameters (mode identification, quantization parameters, movement vectors, and the like) used when performing high-efficiency compressed encoding. Second additional information shown in (c) and (d) indicates parameters for data transmission synchronization (sync codes, synchronized-block numbers, information relating to boundaries between variable-length encoded data, audio-input information (to be described later), and the like). Error-correcting codes are also included in these formats.

The first additional information is included in the fixed-length video data shown in (c) and (d).

The encoding apparatus will now be further described. Writing operations are sequentially performed in accordance with the generation of transmission data S106. Reading operations are performed such that the memory is accessed only when fixed-length video data are generated during the formation of the format shown in (c).

Neither the writing operation nor the reading operation is performed during a vertical blanking period of an image, because video data is absent during the vertical blanking period.

The amount of data is incremented by the detection of the above-described flag SEND for identifying boundaries between blocks during a reading operation, a calculation circuit 250 detects the difference value between an output value from a read counter 240, for recognizing a read pointer for the memory 220, and an output value from a write counter 230, for recognizing a write pointer for the memory 220. A buffer-controlling-parameter generation circuit 260 performs buffer control in which quantization steps are controlled by effecting feedback to the quantization circuit 160, and an inverse quantization circuit (not shown) within the predictive encoding circuit 130 so that the amount of data stored in the memory 220 is within a predetermined range. The fact that the amount of data stored in the memory 220 is within the predetermined range indicates that write and read pointers for the memory 220 have values within a certain range.

The amount of data within the predetermined range is controlled by being switched in accordance with the presence/absence of audio data.

In this control method, an audio-input detection circuit 195 determines if audio data has been input, and the result of the determination is supplied to the buffer-controlling-parameter generation circuit 260, which sets the amount of data within the predetermined range in accordance with the result of the determination.

Audio-input information indicating the result of the determination is also supplied to the formatter circuit 200.

Encoded data S108 subjected to buffer control in the above-described manner is supplied to the formatter circuit 200.

A description will now be provided of an ECC format formed in the formatter circuit 200.

Figure 4A:
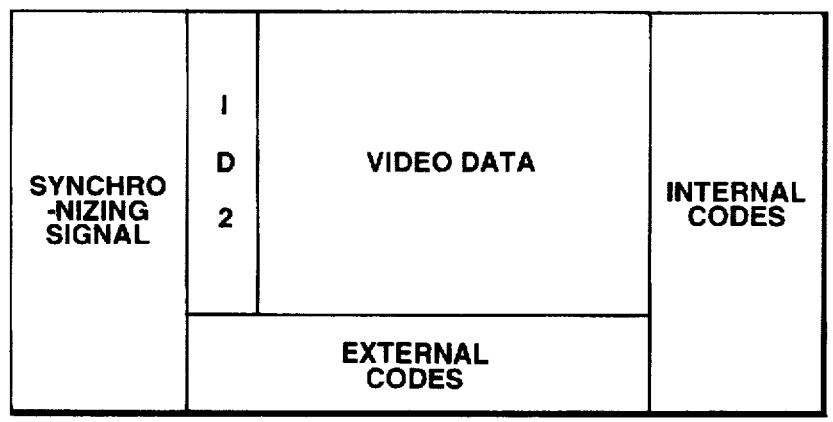
FIG. 4 is a diagram illustrating the configuration of an ECC (error-correcting code) format of the first embodiment.

If audio data to be multiplexed with video data is absent, an ECC format as shown in FIG. 4(a) is formed.

A synchronizing signal and ID2 shown in FIG. 4(a) correspond to the second additional information shown in FIG. 3, and video data shown in FIG. 4(a) corresponds to the fixed-length video data shown in (c) of FIG. 3. ECC formats having the above-described configuration are sequentially read, and are transmitted to the outside.

A case, in which audio data to be multiplexed with video data is present, will now be described in detail.

Audio data corresponding to the frame period of video data is subjected to interleaving processing and the like, and is stored in an audio memory 190. Entire data S109 corresponding to the frame period of processed video data is read from the audio memory 190 during a vertical blanking period of an image in response to an audio-data read control signal SRA, and is input to the formatter circuit 200. The formatter circuit 200 forms an ECC format as shown in FIG. 4(b).

Figure 4B:
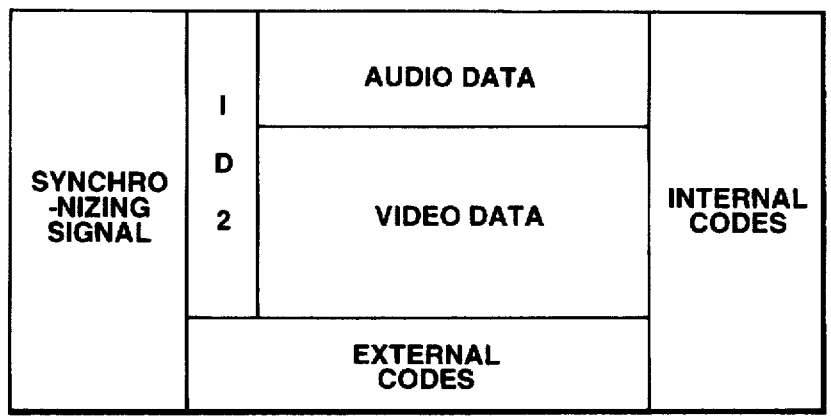

ECC formats configured as shown in FIG. 4(b) are sequentially read, and are transmitted to the outside (see (e) in FIG. 3).

A signal $S_C$ shown in FIG. 2 represents a signal for identifying a vertical blanking period of video data. The formatter circuit 200 generates a video-data read control signal $S_{RV}$ and an audio-data read control signal $S_{RA}$ in response to the signal $S_C$.

A description will now be provided of processing of decoding data encoded in the above-described manner.

FIG. 5 is a block diagram of a decoding apparatus according to another embodiment of the present invention.

In FIG. 5, transmitted data received via a transmission channel is written in a memory 1000 in accordance with a synchronizing signal included in the data. Thereafter, transmission errors in the stored data are corrected by an error correction circuit 1010. The data subjected to error correction is input to a variable-length decoding circuit 1020, a mode detection circuit 1080, a quantization-step detection circuit 1090, an audio memory 1100, and an audio-output detection circuit 1110.

The variable-length decoding circuit 1020 determines if the input data is video data from the above-described second additional information which has been transmitted, and performs decoding processing. The decoding processing is performed based on information relating to boundaries between variable-length encoded data included in the second additional information. The variable-length decoding circuit 1020 outputs the result of the processing to an inverse quantization circuit 1030.

The video data input to the inverse quantization circuit 1030 is subjected to inverse quantization processing based on a quantization-step control signal from the quantization-step detection circuit 1090. The quantization-step detection circuit 1090 detects information relating to quantization steps from the above-described first additional information transmitted together with the video data.

The video data subjected to inverse quantization is subjected to inverse DCT processing by an inverse-DCT circuit 1040. The video data subjected to the inverse-DCT processing is input to an addition circuit 1050. The addition circuit 1050 adds predictive data generated by a predictive-data generation circuit 1070 and the video data output from the inverse DCT circuit 1040.

A switch 1060 selects one of video data output from the addition circuit 1050 and the video data output from the inverse DCT circuit 1040 based on an output from the mode detection circuit 1080, and inputs the selected data to a frame memory 1100. Video data input to the frame memory 1100 is output to a video-data output terminal 1110 in a predetermined sequence.

The mode detection circuit 1080 detects information relating to the encoding mode from the first additional information transmitted together with video data, and controls the switch 1060 based on the result of the detection. The predictive-data generation circuit 1070 also detects information relating to movement and the like from the first additional information, and generates predictive data.

An audio-output detection circuit 1130 detects an audio-signal-input information from the second additional information, and outputs a write control signal to an audio memory 1120 in accordance with the result of the detection. The audio memory 1120 writes data based on the control signal from the audio-output detection circuit 1130. The audio data written in the audio memory 1120 is subjected to deinterleaving processing, and is output to an audio-data output terminal 1140 in synchronization with the frame signal of video data.

The present invention may be executed in various other forms without departing from the spirit and the main features thereof.

For example, although in the foregoing embodiments examples are illustrated in which audio data is multiplexed with video data, it is apparent that data to be multiplexed with video data is not limited to audio data.

Although the audio-input detection circuit 195 shown in FIG. 2 detects the presence of audio data, the amount of transmission of the audio data may be detected, and the buffer-controlling-parameter generation circuit 260 may be controlled in accordance with the result of the detection. It is thereby possible to prevent the above-described degradation in the picture quality of video data caused by multiplexing processing, even if data multiplexed to the video data is not limited to particular audio data.

In other words, the foregoing description of embodiments has been given for illustrative purposes only and not to be construed as imposing any limitation in every aspect.

The scope of the invention is, therefore, to be determined solely by the following claims and not limited by the text of the specifications and alterations made within a scope equivalent to the scope of the claims fall within the true spirit and scope of the invention.

What is claimed is:

1. An encoding apparatus comprising:
   a) first input means for inputting first information data;
   b) second input means for inputting second information data;
   c) encoding means for encoding the first information data;
   d) memory means for storing the first information data encoded by said encoding means; and
   e) control means for controlling said encoding means so that a storage amount of data of said memory means falls within a predetermined range; and
   f) changing means for adaptively changing the amount of data within the predetermined range in accordance with an input state of the second information data.

2. An apparatus according to claim 1, wherein the first information data is image data.

3. An apparatus according to claim 2, wherein said encoding means includes quantizing means for quantizing the first information data, and said control means controls quantization steps of said quantizing means.

4. An apparatus according to claim 2, wherein the second information data is audio data.

5. An apparatus according to claim 4, further comprising multiplexing means for multiplexing the audio data with the image data output from said memory means.

6. An apparatus according to claim 5, wherein said multiplexing means multiplexes the audio data for a vertical blanking period of the image data.

7. An encoding method comprising:
   a) a first input step of inputting first information data;
   b) a second input step of inputting second information data;
   c) an encoding step of encoding the first information data;
   d) a memory step of storing in a memory the first information data encoded by said encoding step; and
   e) a control step of controlling said encoding step so that a storage amount of data of said memory means falls within a predetermined range; and
   f) a changing step adaptively changing the amount of data within the predetermined range in accordance with an input state of the second information data.

8. A method according to claim 7, wherein the first information data is image data.

9. A method according to step claim 8, wherein said encoding step includes a quantizing step of quantizing the first information data, and said control step controls quantization steps of said quantizing step.

10. A method according to claim 8, wherein the second information data is audio data.

11. A method according to claim 10, further comprising a multiplexing step of multiplexing the audio data with the image data stored in said memory step.

12. A method according to claim 11, wherein said multiplexing step multiplexes the audio data for a vertical blanking period of the image data.

* * * * *

UNITED STATES PATENT AND TRADEMARK OFFICE
CERTIFICATE OF CORRECTION

PATENT NO. : 5,784,112
DATED : July 21, 1998
INVENTOR(S) : YOSHIMI OGASAWARA ET AL.

It is certified that error appears in the above-identified patent and that said Letters Patent is hereby corrected as shown below:

COLUMN 5 line 61, "SRA" should read --$S_{RA}$,--.

COLUMN 7 line 30, "and" should be deleted.

COLUMN 8 line 22, "step" should read --step of--; and
line 27, "step" should be deleted.

Signed and Sealed this

Thirteenth Day of July, 1999

Attest:

Attesting Officer

Q. TODD DICKINSON

Acting Commissioner of Patents and Trademarks